United States Patent [19]
Bartlett

[11] Patent Number: 4,675,968
[45] Date of Patent: Jun. 30, 1987

[54] SLIDE HAMMER-TYPE PULLER AND INSTALLER ASSEMBLY

[75] Inventor: William T. Bartlett, Conley, Ga.

[73] Assignee: Oran R. Leake, Jr., Morrow, Ga. ; a part interest

[21] Appl. No.: 811,362

[22] Filed: Dec. 20, 1985

[51] Int. Cl.[4] .......... B23P 19/04
[52] U.S. Cl. .......... 29/254
[58] Field of Search .......... 29/254, 255, 275, 264

[56] References Cited

U.S. PATENT DOCUMENTS

| | | | |
|---|---|---|---|
| 2,779,089 | 1/1957 | Allen | 29/254 |
| 3,106,012 | 10/1963 | Comer | 29/254 |
| 4,387,697 | 6/1983 | Duke | 29/254 |
| 4,457,061 | 7/1984 | Eason | 29/264 |

*Primary Examiner*—Robert C. Watson
*Attorney, Agent, or Firm*—Harvey B. Jacobson; Clarence A. O'Brien

[57] ABSTRACT

An impact puller and installer of the type including a support shaft having an enlarged abutment on one end and an enlarged adapter on the other end is provided. A combined handgrip and impact member is slidably mounted on the shaft between the abutment and the adapter for selective impact therewith and the end of the adapter remote from the abutment includes an externally threaded end portion for threaded engagement within a central bore formed in a disc to be pulled or installed. A second adapter is provided and is in the form of an elongated sleeve having a threaded bore formed therethrough including an enlarged counterbore at one end. The first adapter is removably threadedly engageable within the threaded bore of the second adapter and the end of the second adapter sleeve through which the counterbore opens is provided with a circumferential radially outwardly projecting flange having two sets of a plurality of bores formed therethrough, the second adapter being attachable to the wheel mounting flange of a hub to be pulled.

7 Claims, 7 Drawing Figures

SLIDE HAMMER-TYPE PULLER AND INSTALLER ASSEMBLY

BACKGROUND OF THE INVENTION

1. Field of the Invention

This invention relates to a slide hammer specifically designed to pull and install drive discs and drive wheel hubs of riding lawnmowers.

2. Description of Related Art

Various different forms of slide hammer-type pullers and installers heretofore have been provided such as those disclosed in U.S. Pat. Nos. 1,873,294, 1,893,414, 2,310,372, 2,377,304, 2,779,089, 3,003,230, 3,106,012, 3,358,352, 3,846,898 and 4,283,827. While most of these previously known forms of pullers and installers have been defined for specific purposes, none have been designed for the express purpose to be used in the disassembly and assembly of drive discs and drive axle wheel hubs utilized on some types of riding lawnmowers.

SUMMARY OF THE INVENTION

The slide hammer-type puller and installer assembly of the instant invention has been specifically design to be utilized in both the removal and installation of lawnmower drive discs and lawnmower drive axle wheel hubs of the type wherein the hub includes a cylindrical body projecting outwardly of the wheel mounting flange thereof.

The assembly is in the form of a conventional slide hammer assembly, but one end of the shaft thereof has a first adapter mounted thereon which may be threadedly received within the central threaded bore of a drive disc to be removed and/or installed. In addition, the assembly includes a second adapter in the form of a cylindrical body having a threaded central bore formed therethrough equipped with a diametrically enlarged counterbore at one end. The cylindrical body end corresponding to the counterbore end of the threaded bore has a radially outwardly projecting mounting flange thereon including two sets of circumferentially spaced apertures formed therethrough and the threaded end of the first adapter is removably threadedly engageable within the threaded bore formed in the flange equipped cylindrical body comprising the second adapter. Accordingly, the assembly of the instant invention may be alternately used during both removal and installation of the drive disc and drive axle wheel hub of a riding lawnmower.

The main object of this invention is to provide a slide hammer-type puller and installer which may be used to accomplish different removal and installation operations which must be performed during maintenance and/or repair on various models of riding lawnmowers.

Another object of this invention is to provide a combined slide hammer-type puller and installer which may be readily converted for use in installing and/or removing either a drive disc having a central threaded bore formed therein or the wheel hub of the drive axle of a riding lawnmower.

A final object of this invention to be specifically enumerated herein is to provide a combined slide hammer-type puller and installer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
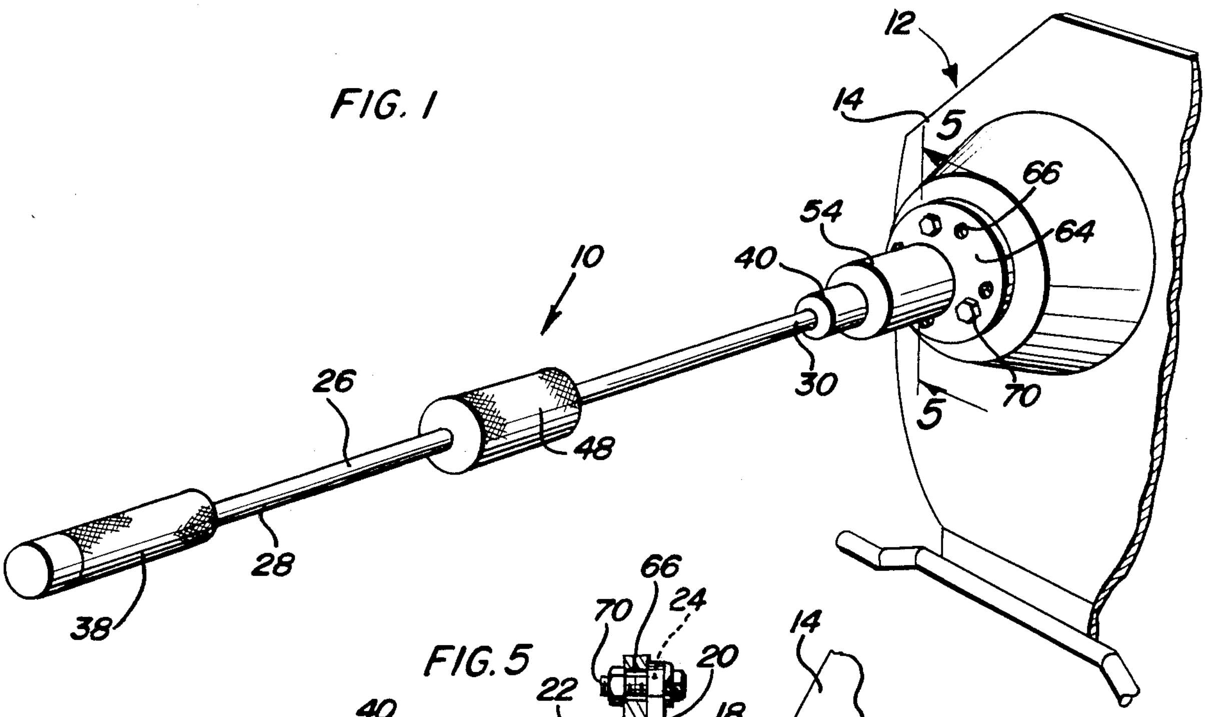
FIG. 1 is a perspective view of the puller and installer assembly of the instant invention in operative association with a riding lawnmower drive axle wheel hub for the purpose of pulling the wheel hub from the drive axle.

Referring now more specifically to the drawings, the numeral 10 generally designates the slide hammer-type puller and installer assembly of the instant invention illustrated in FIG. 1 in operative association with a riding lawnmower referred to in general by the reference numeral 12 and standing upright on its rear end with the near side rear side plate 14 of the mower illustrated in the foreground.

Figure 5:
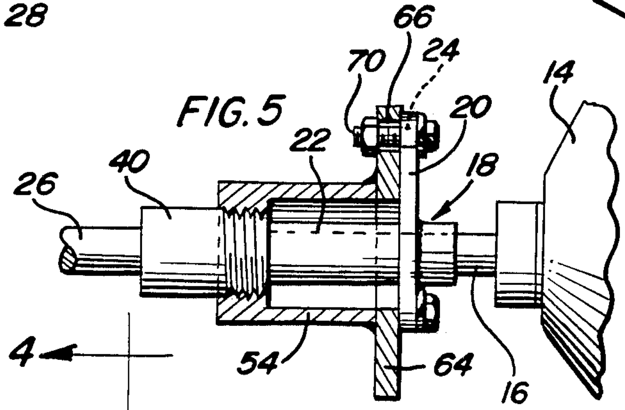
FIG. 5 is a fragmentary vertical sectional view taken substantially upon the plane indicated by the section line 5—5 of FIG. 1.
Figure 3:
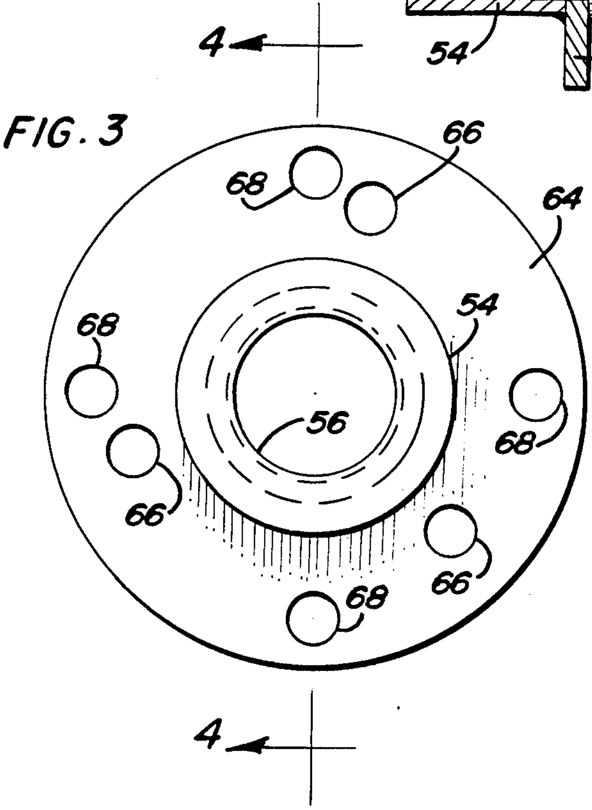
FIG. 3 is an end elevational view of a removable fitting portion of the assembly adapting the latter for securement to a wheel hub to be pulled.
Figure 4:
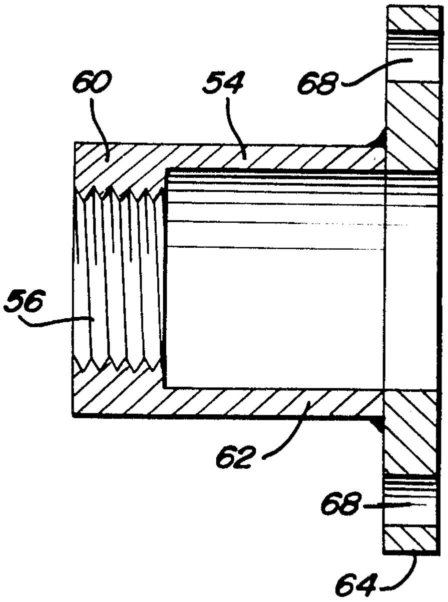
FIG. 4 is a vertical sectional view taken substantially upon the plane indicated by the section line 4—4 of FIG. 3.

As can best be seen from FIG. 5, a rear wheel support and drive shaft 16 is journaled through the side flange or plate 14 and has a wheel hub 18 mounted thereon including a wheel mounting flange 20 and an outwardly projecting sleeve portion 22 projecting outwardly from the wheel mounting flange 20, the latter having three circumferentially spaced wheel mounting bores 24 formed therein.

The assembly 10 includes an elongated shaft 26 having first and second ends 28 and 30 which are externally threaded as at 32 and 34, respectively. An enlarged handgrip defining abutment 36 is threadedly mounted on the first end 28 and includes a roughened cylindrical outer surface 38. A first fitting 40 is threadedly mounted on the second end of the shaft 26 and comprises a cylindrical body having a smooth exterior on a first end 42 thereof with which the second end 30 of the shaft 26 is threadedly engaged and which is externally threaded as at 44 on its second end 46.

A generally cylindrical combined weight and handgrip body 48 has a longitudinal bore 50 formed therethrough and the body 48 is mounted on the shaft 26 with the latter extending through the bore 50. Therefore, the body 48 may be rectilinearly shifted between positions with the opposite ends thereof abuttingly engaging the adjacent ends of the abutment 36 and the first fitting 40, the outer surface of the body 48 being generally cylindrical and roughened as at 52.

Figure 2:
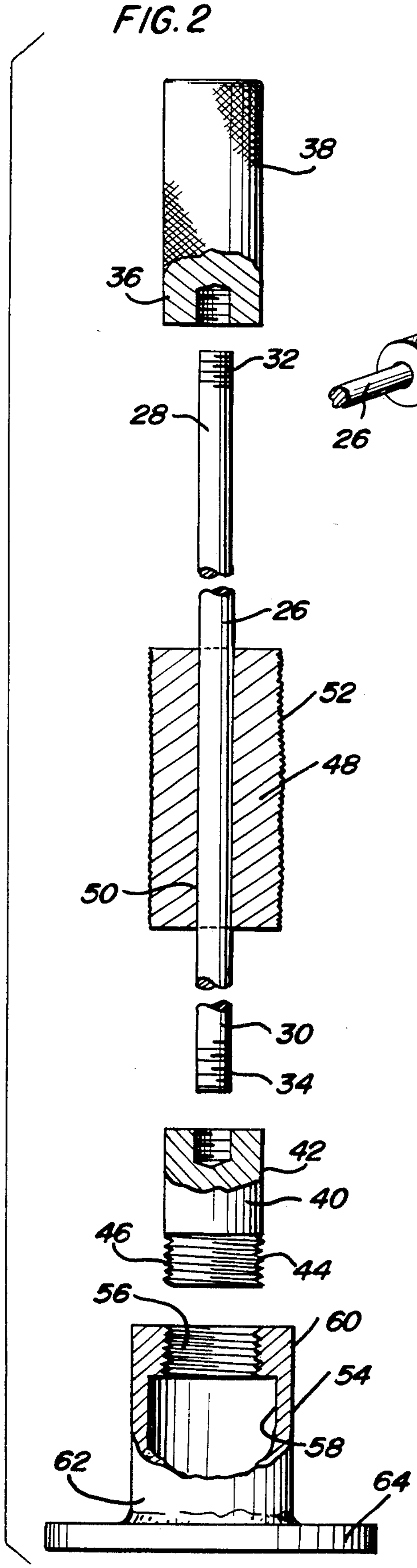
FIG. 2 is a fragmentary enlarged exploited elevational view of the combined puller and installer assembly with parts thereof being broken away and illustrated in longitudinal section.
Figure 6:
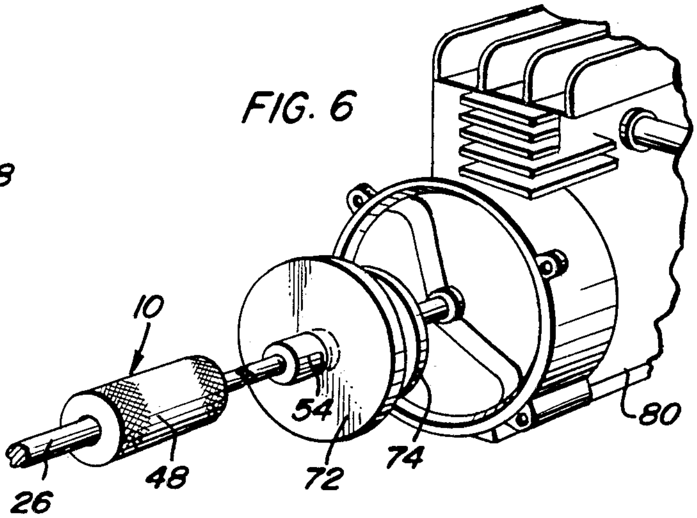
FIG. 6 is a fragmentary perspective view of the assembly in use pulling a drive disc, a blade drive pulley and a mounting sleeve from the crank shaft of the mower.
Figure 7:
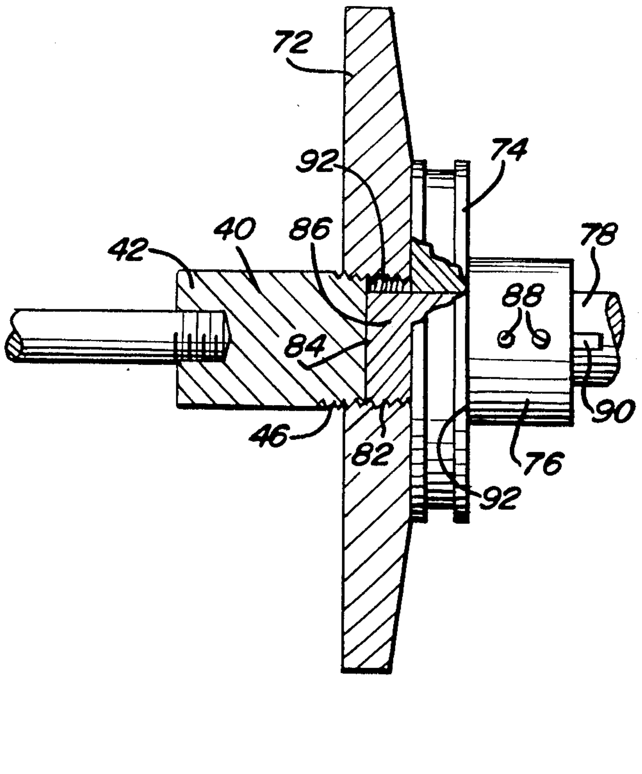
FIG. 7 is a side elevational view of the middle portion of the assemblage illustrated in FIG. 1 with portions of the puller assembly, drive disc and blade drive puller broken away and illustrated in vertical section.

A second fitting, illustrated in the lower portion of FIG. 2, is provided and referred to by the reference numeral 54. The fitting 54 is generally cylindrical in configuration and includes a longitudinal threaded bore 56 formed therethrough including a smooth counterbore 58. The threaded bore 56 opens outwardly of a first end 60 of the fitting 54 and the smooth counterbore 58 opens outwardly of the second end 62 of the fitting 54. In addition, the second end 62 includes a radially outwardly projecting and circumferential flange 64 having two sets of bores 66 and 68 formed therethrough. The bores 66 equal three in number and are equally angularly spaced about the flange 64 while the bores 68 equal four in number and are equally angularly spaced about the flange 64.

In operation, when it is desired to pull the wheel hub 18 from the shaft 16, suitable fasteners 70 are secured through the bores 66 and the bores 24 aligned therewith and the body 48 may be slid rapidly along the shafts 26 and sharply abutted against the abutment 36. Of course, if the wheel hub 18 is to be installed on the shaft 16, after the fitting 54 has been anchored to the flange 20 of the hub 18 through the utilization of the fasteners 70, the body 48 may be slid rapidly along the shaft 26 and abutted against the first fitting 40, the threaded second end of the first fitting 40 being removably threadedly engaged in the threaded bore 56.

On the other hand, when it is desired to remove the drive disc 72, blade drive pulley 74 and mounting collar 76 mounted on the crank shaft 78 of the engine 80, the second fitting 54 is removed and the threaded second end of the first fitting 40 is threaded into the threaded bore 82 formed centrally through the drive disc 72 with the end of the first fitting 40 remote from the abutment 36 tightly jammed against the terminal end face 84 of the diametrically reduced end 86 of the mounting sleeve 76. The large diameter end of the mounting sleeve 76 includes a pair of set screws 88 which may be tightened into engagement with a key 90 carried by the shaft 78 and received in a keyway (not shown) formed in the large diameter end of the mounting sleeve 76. The small diameter end 88 of the sleeve 76 includes a flat 92 thereon and the pulley is slidably mounted on the non-circular end 86 of the mounting sleeve 76 between the shoulder 92 and the drive disc 72, the latter being tightly threadedly engaged on the mounting sleeve end 86.

In order to remove the disc 72, the pulley 78 and the mounting sleeve 76, the set screws 88 are loosened and the body 48 is rapidly slid along the shaft 26 into abutting engagement with the abutment 36.

The assembly 10, therefore, may be seen to be usable not only to remove the wheel hub 18, but also to remove the drive disc 72, the pulley 74 and the mounting sleeve 76. In order to convert the assembly 10 for use in performing one task after having performed the other task, it is merely necessary to either install or remove the second fitting 54.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A slide hammer-type puller and installer assembly for pulling and installing a drive disc and a wheel hub during maintenance and/or repair operations upon a riding mower, said assembly including an elongated shaft having first and second ends, an elongated abutment stationarily mounted on said first end, a first enlarged fitting mounted on said second end, a combined weight and handgrip having a bore formed therethrough slidably mounted on said shaft between said abutment and fitting with said shaft slidably received through said bore and said weight and handgrip including opposite ends through which said bore opens abuttingly engageable with opposing portions of said abutment and fitting, said first fitting including an externally threaded end portion facing in a direction opposite from said abutment and adapted to be removably threaded in a central threaded bore formed in a drive disc, and a second fitting comprising a tubular body having a central bore formed longitudinally therethrough and equipped with an enlarged counterbore at one end, said one end of said tubular body including a radially outwardly projecting flange extending thereabout and including at least one set of a predetermined number of small bores formed therethrough spaced equally about and radially outwardly from the center axis of said central bore, said central bore, at the other end thereof remote from said counterbore, being internally threaded, said externally threaded threaded end portion of said first fitting being removably threadedly engageable in said internally threaded end of said central bore.

2. The assembly of claim 1 wherein said combined weight and handgrip includes a roughened outer cylindrical surface.

3. The assembly of claim 1 wherein said flange includes two sets of said small bores formed therethrough.

4. The assembly of claim 3 wherein one set of said small bores equals four in number.

5. The assembly of claim 4 wherein the second set of small bores equals three in number.

6. The assembly of claim 1 wherein said counterbore is of an axial extent approximately three times the axial extent of the threaded portion of said central bore.

7. The assembly of claim 1 wherein said combined weight and handgrip includes a roughened outer cylindrical surface, said abutment also including a roughened outer cylindrical surface.

* * * * *